LOCKING SYSTEM FOR A CARD READER

Filed March 14, 1966 2 Sheets-Sheet 1

INVENTOR.
CHRISTOPHER KINGSLEY BROWN
BRYCE WILSON BLAIR
BY Curtis, Morris & Safford May 12, 1970 B. W. BLAIR ET AL 3,511,975

LOCKING SYSTEM FOR A CARD READER

Filed March 14, 1966 2 Sheets-Sheet 2

INVENTOR.
CHRISTOPHER KINGSLEY BROWN
BRYCE WILSON BLAIR
BY Curtis, Morris & Safford

United States Patent Office 3,511,975

Patented May 12, 1970

3,511,975

LOCKING SYSTEM FOR A CARD READER

Bryce Wilson Blair, Hershey, and Christopher Kingsley Brown, Camp Hill, Pa., assignors to AMP Incorporated, Harrisburg, Pa.

Filed Mar. 14, 1966, Ser. No. 534,098

Int. Cl. G06k *9/04;* H01h *43/08*

U.S. Cl. 235—61.11 7 Claims

ABSTRACT OF THE DISCLOSURE

A card reader comprises a card-reading area into which a card to be read is disposed and includes stationary and movable contact means. Operating means are operatively connected to the movable contact means to move the movable contact means toward and away from the stationary contact means. Locking means is operatively engaged with the operating means to maintain the operating means in a locked position until a card to be read has been placed within the card-reading area and in engagement with the locking means whereupon the locking means is disengaged from the operating means so that the operating means can operate the movable contact means to read the information on the card to be read.

This invention relates to a locking system or means and more particularly to a locking system for a card reader or the like.

In the card reader disclosed in U.S. pat. application Ser. No. 441,179, filed Mar. 19, 1965, this card reader is operable at will whether or not a card is disposed in the card-reading area thereof. This creates unnecessary wear of the parts of the card reader and especially on the contacts thereof, and, if the contacts are in a closed position, clearance does not exist to insert the card into the card-reading area.

An object of the invention is to provide a card reader to be operated only when a card is properly placed within the card-reading area of the card reader.

Another object of the invention is the provision of a locking system for a card reader which will permit the card reader to be operated only when a card to be read has been properly positioned within the card-reading area of the card reader.

A further object of the invention is to provide a locking system for a card reader which includes an eject spring to eject a card from the card-reading area after the card has been read therein and to automatically lock the card reader until another card has been placed within the card-reading area.

An additional object of the invention is the provision of a locking system for a card reader to prevent the operation thereof until a card to be read has been properly positioned within the card-reading area of the card reader so as to prolong the life expectancy of the contacts therein.

A still further object of the invention is to provide means in the card-reading area to assure that the card to be read is properly positioned within the card-reading area to engage the locking means to move same out of locking engagement with the operating means of the card reader.

Other objects and attainments of the present invention will become apparent to those skilled in the art upon a reading of the following detailed description when taken in conjunction with the drawings in which there is shown and described an illustrative embodiment of the invention; it is to be understood, however, that this embodiment is not intended to be exhaustive nor limiting of the invention but is given for purposes of illustration in order that others skilled in the art may fully understand the invention and the principles thereof and the manner of applying it in practical use so that they may modify it in various forms, each as may be best suited to the conditions of a particular use.

The foregoing objects are achieved in the present invention through the provision of a card reader comprising a card-reading area into which a card to be read is disposed and including stationary and movable contact means, operating means connected to the movable contact means to move the movable contact means toward and away from the stationary contact means, and locking means operatively engaging the operating means to maintain the operating means in a locked position until a card to be read has been placed within the card-reading area and in engagement with the locking means whereupon the locking means is disengaged from the operating means.

Figure 6:
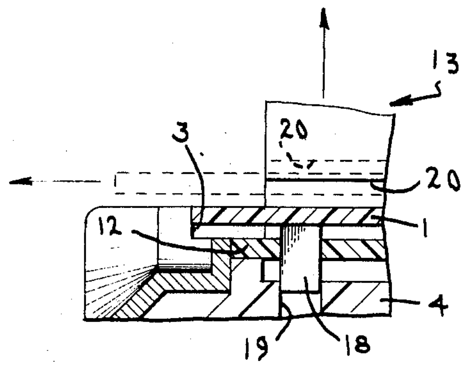
FIG. 6 is a partial sectional view showing the operation of the means to lift the card free from a forward retaining edge so that the card can be ejected from the card-reading area.
Figure 1:
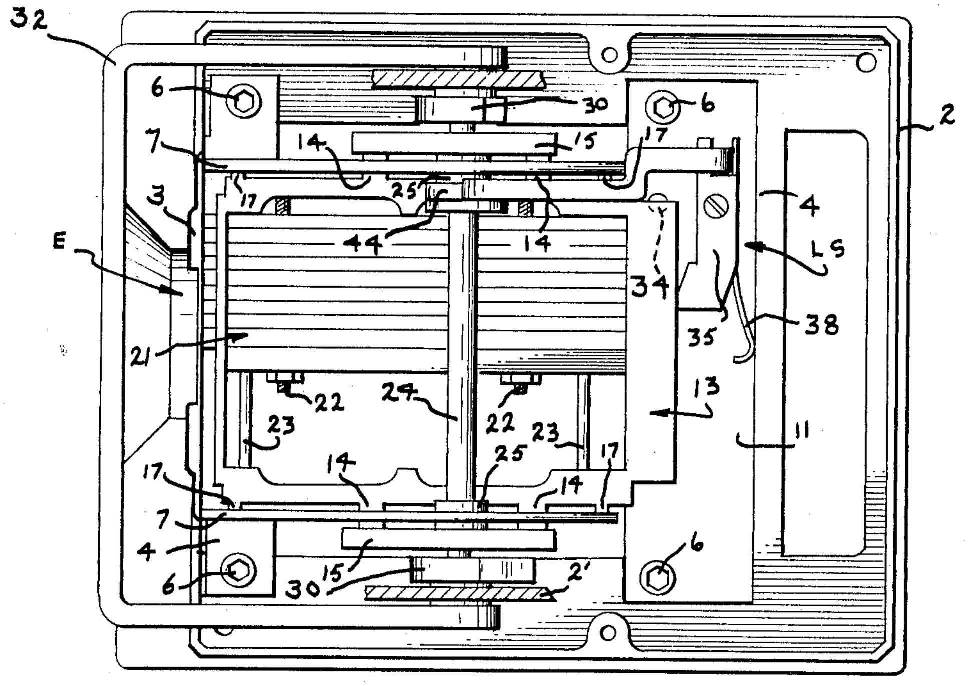
FIG. 1 is a plan view of a card reader and locking system therefor.

Turning now to the drawings, FIG. 1 illustrates a card reader CR of the type disclosed in the above-mentioned patent application in order to read the quoted information. Entrance E is formed between base 2 and a cover member 2', only partially shown. Entrance E is in communication with a recessed area 3 in the center part of the front wall of base 2. An outer end of card 1 is pressed against recessed area 3 when a card is in position within the card reader, and this recessed area maintains the card in position therein as illustrated in FIG. 6.

A mounting base 4 is secured to base 2 by screw members 6. Mounting plates 7 are secured to each side of mounting base 11 via screw members 8 at the front ends thereof and by pins 9 about midway thereof. Part of each pin 9 extends outwardly from its corresponding mounting plate 7. Rectangular openings 10 are located in each mounting plate 7 on each side of pin 9. A channel 11 is located at the inner end of mounting base 4 and a stationary contact assembly 12 is located on the upper surface of mounting base 4 as illustrated in FIG. 6.

Carriage 13 is movably mounted between mounting plates 7 and mounting base 4. Extensions 14 extend outwardly from each side of carriage 13 through respective openings 10 in each mounting plate 4. Each extension 14 is secured to a guide and operating member 15 by screw means 16. Projections 17 extend outwardly from each side of carriage 13 forwardly and rearwardly of extensions 14, and these projections engage mounting plate 7 in order to maintain carriage 13 in parallel alignment with mounting base 4 during the movement of carriage 13. Lug 18 extends inwardly from each front side of carriage 13, and, as illustrated in FIG. 6, these lugs mate with slots 19 in stationary contact assembly 12 and mounting base 4. Each side of carriage 13 above lugs 18 has a stepped section 20. Contact assembly 21 is mounted on carriage 13 via bolts 22 and insulated rods 23. Contact assembly 21 is movable along with carriage 13 thereby defining a movable contact assembly.

Rod 24 is rotatably mounted in plastic bushings 25 which are disposed in apertures in mounting plates 7. The parts of rod 24 that extend outwardly from mounting plates 7 are disposed in slots 26 in guide and operating members 15. U-shaped recesses 27 are disposed in the bottoms of members 15 in alignment with slots 26 and each of pins 9 is disposed in their respective recess 27. L-shaped openings 28 are disposed in members 15 and these are defined as cam surfaces to move carriage 13 toward and away from mounting base 4 with rod 24, slots 26, pins 9 and recesses 27 defining the guide means to assure parallel movement of carriage 13 relative to base 4 and stationary contact assembly 12. Integral spring members 29 extend outwardly from members 15 and engage mounting base 4 to return carriage 13 to its normally inoperative position.

Figure 4:
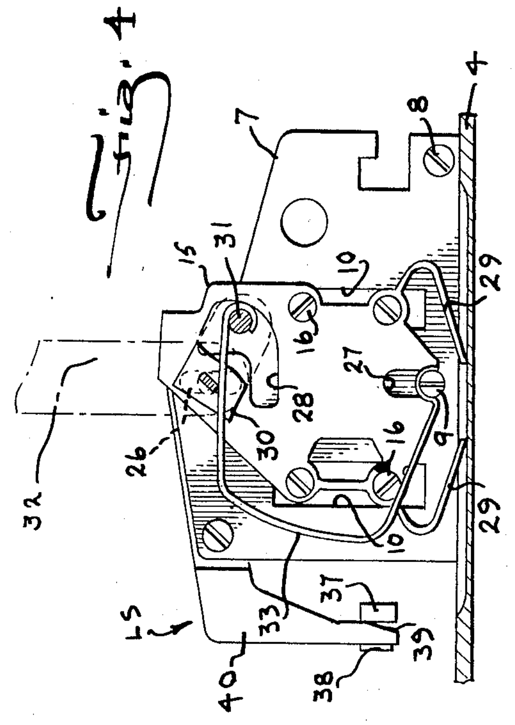
FIG. 4 is a side elevational view showing the locking system in a normally locked position.

Actuating members 30 are keyed onto the ends of rod 24 so as to be movable therewith and each actuating member has a pawl member 31 extending outwardly therefrom which is cooperable with a corresponding opening 28. Upon movement of pawl member 31 in openings 28, members 15, carriage 13 and associated contact assembly 21 are movable in a parallel manner relative to base 4 and stationary contact assembly 12. After the cover member has been placed in position on base 2, the ends of handle 32 are keyed onto the ends of rod 24 which extend outwardly through openings in the sides of the cover members so as to move actuating member 30 through their angular operating positions. A spring 33 has its ends in engagement with pawl members 31 and pins 9 to return actuating members 30 and pawl members 31 to their normally inoperative position as illustrated in FIG. 4.

The card-receiving area is defined by recessed area 3, the inner surfaces of the sides of carrier 13, stepped sections 20 and the area between the stationary contact assembly and the movable contact assembly.

Figure 3:
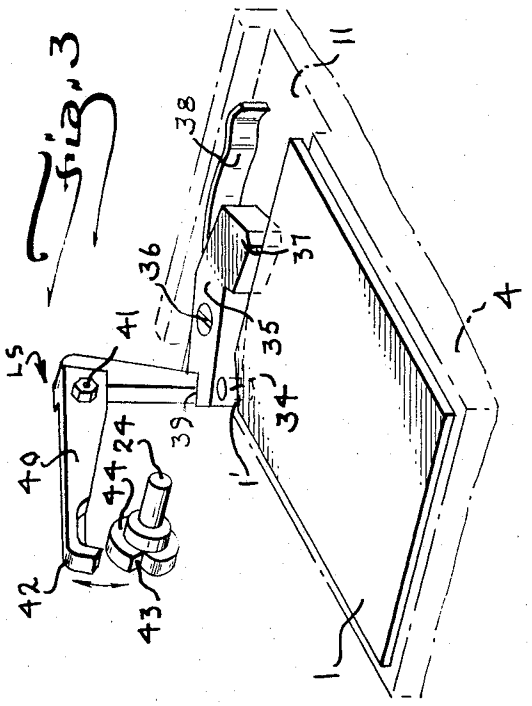
FIG. 3 is a perspective view similar to FIG. 2 showing a card to be read in engagement with the locking system which has been moved out of locking engagement.
Figure 5:
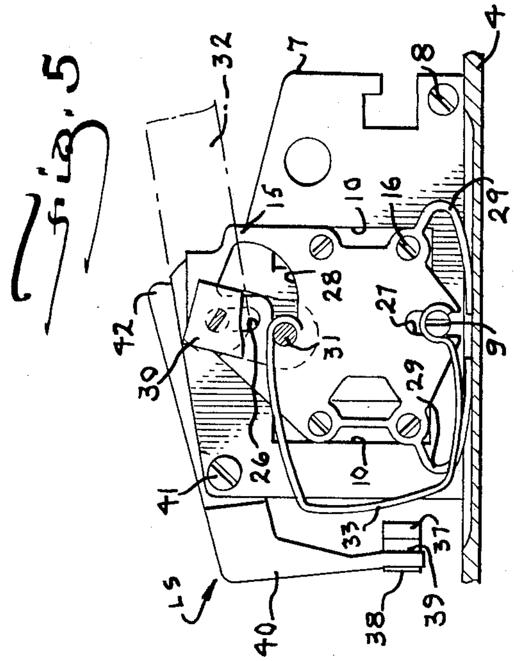
FIG. 5 is a view similar to FIG. 4 showing the locking system in an unlocked position.
Figure 2:
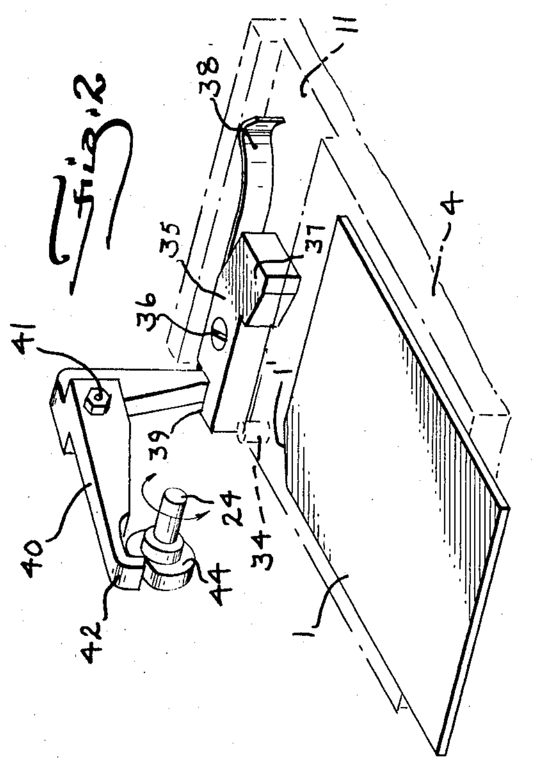
FIG. 2 is a perspective view of the locking system in a locked position.

In order to assure that coded perforations in card 1 are disposed in the card-receiving area so that this code can be read by the stationary and movable contact assemblies, corner 1' of card 1 is beveled and this beveled corner engages a pin 34 in mounting base 4 of the inner portion of the card-receiving area as illustrated in FIG. 3. If the card is not properly placed in the card-receiving area so that corner 1' engages pin 34, then the card cannot be properly placed in the card-receiving area since it cannot be placed all the way therein.

Locking system LS comprises an actuating lever 35 pivotally disposed in channel 11 by means of a screw 36. Actuating lever 35 includes a projection 37 normally disposed against the front wall of channel 11 with a portion of projection 37 extending above mounting base 4 and the stationary contact assembly disposed thereon. A leaf spring 38 is secured to lever 35 and has an arcuate end disposed against the back surface of channel 11. A cutout 39 is located in the outer end of lever 35 and receives therein one end of a bell-crank lever 40 pivotally connected to a mounting plate 7 by means of bolt 41. The other end of bell-crank lever 40 has a pawl 42 which normally engages a stepped section 43 of a locking member 44 secured on rod 24 in alignment with bell-crank lever 40. Spring 38 normally maintains projection 37 of lever 35 against the forward side of channel 11 and lever 35 in turn maintains bell-crank lever 40 in a normally locked position so that pawl 42 is in engagement with stepped section 43 of locking member 44. As can be discerned, the top surface of locking member 44 starting at the bottom of stepped section 43 to the top thereof is a continuously curved surface.

The operation of the locking system is as follows:

When card 1 is properly disposed in the card-reading area so that beveled corner 1' is in alignment with pin 34, the leading edge of card 1 engages projection 37 of actuating lever 35 and pivotally rotates this lever about screw 36 against the bias of leaf spring 38 thereby causing bell-crank lever 40 to be moved about bolt 41 which lifts pawl 42 out of engagement with stepped section 43. Handle 32 can then be moved which rotates rod 24 and actuating members 30 along therewith. Pawl members 31 move along L-shaped openings 28 causing carriage 13 to be moved in a downward and parallel direction toward mounting base 4. Movable contact assembly 21 and the contacts thereof engage the top surface of card 1 and the contacts in alignment with the coded apertures in the card extend through these apertures and electrical contact is effected with the corresponding stationary contacts in stationary contact assembly 12 to read out the coded information of card 1 through appropriate circuitry (not shown) of the card reader.

After the coded information has been read out from card 1, handle 32 is then moved manually and under the influence of spring members 29 and springs 30 to its normally locked position as illustrated in FIG. 4, and beyond this point until pawl members 31 engage the upper ends of openings 28. As pawl members 31 are moved to the upper ends of openings 28, lugs 18 engage the bottom surface of card 1 adjacent the forward end thereof and lift the forward edge of card 1 free of recessed area 3. Leaf spring 38 now comes into play and pivots lever 35 about pivot screw 36, partially ejecting card 1 out through entrance E, lever 35 moves bell-crank lever 40 in a downward direction placing pawl 42 in locking alignment with stepped section 43 and projection 37 abuts against the forward side of channel 11. After card 1 has been removed, handle 32 then moves to the normally inoperative position of FIG. 4 which moves stepped section 43 into engagement with pawl 42 and the card reader is then in its locked condition until another card is disposed in the card-reading area to engage locking system LS to unlock the carriage actuating mechanism to read this card.

As can be discerned, there has been disclosed a unique and novel locking system to unlock the actuating mechanism of a card reader when a card is properly positioned within the card-reading area of the card reader.

It will, therefore, be appreciated that the aforementioned and other desirable objects have been achieved; however, it should be emphasized that the particular embodiment of the invention, which is shown and described herein, is intended as merely illustrative and not as restrictive of the invention.

The invention is claimed in accordance with the following:

1. A card reader for reading coded information on a data card comprising stationary contact means, movable contact means normally spaced from said stationary contact means, means maintaining said movable contact means normally spaced from said stationary contact means to provide a card-receiving area therebetween in which a data card can be placed and to return said movable contact means to its normally spaced position after it has been moved into engagement with a data card to read the coded information thereon, operating means connected to said movable contact means to move said movable contact means toward said stationary contact means, locking means connected to said operating means for locking said operating means in a non-operative position, and means connected with said locking means and disposed adjacent said card-receiving area for engagement by the data card when it is positioned within said card-receiving area to thereby move said locking means out of engagement with said operating means so that said operating means can move said movable contact means in engagement with the data card to read the coded information thereon.

2. A card reader according to claim 1 wherein means located in said card-receiving area and on the data card assure proper positioning of the card to be read in the card-receiving area so as to engage and operate said means to move said locking means.

3. A card reader according to claim 1 wherein means including said means to move said locking means maintain the card to be read in position in said card-receiving area during a reading operation thereon.

4. A card reader according to claim 3 wherein said movable contact means includes means to engage the card in the card-receiving area after it has been read and during the movement of said movable contact means to its normally inoperative position to thereby free the card from said maintaining means so that the card can be removed from said card-receiving area.

5. A card reader according to claim 4 wherein means is provided by said means to move said locking means to eject the card from the card-receiving area after the card has been moved free of said maintaining means by said engaging means on said movable contact means.

6. In a card reader, a card-reading area provided with stationary contact means and movable contact means for receiving a card to be read therebetween, operating means provided for moving said movable contact means toward and away from said stationary contact means, connecting means for connection with said operating means to maintain said operating means in a normally inoperative position when the card to be read is not positioned in said card-reading area, card-engaging means in alignment with said card-reading area and connected with said connecting means, said card-engaging means upon being engaged by the card to be read actuating said connecting means to disconnect said connecting means from said operating means so that said operating means can operate said movable contact means to thereby read the information of the card to be read, and means including said card-engaging means for maintaining the card to be read in position in said card-reading area during the reading operation on the card to be read.

7. In a card reader according to claim 6 wherein said movable contact means includes means to free the card to be read from said maintaining means during the movement of said movable contact means to said normally inoperative position after the contact means has read the information of the card to be read, and means provided by said card-engaging means for ejecting the card to be read when said freeing means has freed the card to be read from said maintaining means.

References Cited

UNITED STATES PATENTS

| | | | |
|---|---|---|---|
| 2,890,828 | 6/1959 | Stork et al. | |
| 2,936,113 | 5/1960 | Clark et al. | 235—61.11 |
| 3,066,863 | 12/1962 | Wilson. | |
| 3,304,411 | 2/1967 | Blodgett. | |

DARYL W. COOK, Primary Examiner

U.S. Cl. X.R.

200—46